United States Patent
Kim

(10) Patent No.: US 6,320,615 B1
(45) Date of Patent: *Nov. 20, 2001

(54) LIGHT LEVEL DETECTING AND INDICATING METHOD FOR IMAGE PHOTOGRAPHING AND RECORDING

(75) Inventor: Ji-ho Kim, Seoul (KR)

(73) Assignee: Samsung Electronics Co., Ltd., Kyungki-Do (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/752,562

(22) Filed: Nov. 21, 1996

(30) Foreign Application Priority Data

Dec. 27, 1995 (KR) ................................. 95-59534

(51) Int. Cl.⁷ ........................... H04N 5/235; H04N 5/238
(52) U.S. Cl. ............................... 348/229; 348/364
(58) Field of Search ..................... 348/222, 227, 348/228, 229, 255, 296, 362–364, 366, 370, 371, 230–233; 396/98, 147, 157, 162, 163, 172, 201, 202; H04N 5/235, 5/238

(56) References Cited

U.S. PATENT DOCUMENTS

| | | | |
|---|---|---|---|
| 4,972,265 | * 11/1990 | Tanaka et al. | 348/230 |
| 5,579,049 | * 11/1996 | Shimaya et al. | 348/364 |
| 5,604,537 | * 2/1997 | Yamazaki et al. | 348/380 |
| 5,625,411 | * 4/1997 | Inuiya et al. | 348/220 |
| 5,737,018 | * 4/1998 | Shimizu | 348/363 |
| 5,818,975 | * 10/1998 | Goodwin et al. | 382/274 |
| 5,883,666 | * 3/1999 | Kyuma et al. | 348/229 |

* cited by examiner

Primary Examiner—Wendy R. Garber
Assistant Examiner—Ngoc-Yen Vu
(74) Attorney, Agent, or Firm—Sughrue, Mion, Zinn, Macpeak & Seas, PLLC

(57) ABSTRACT

A light level detecting method uses an automatic gain control of an electrically transformed image signal, thereby obviating the need for a separate light sensor. Instead, the method makes use of the image signal in the recording process. The light detecting and indicating method includes the steps of: (a) setting up a reference value corresponding to an amount of light which requires an automatic gain control; (b) measuring the amount of light of an optical input signal; (c) calculating a comparative value corresponding to the amount of light, where the comparative value controls the performance of the automatic gain control; (d) comparing the reference value with the comparative value; and (e) determining that the amount of light is insufficient when the result of the comparing step falls within a predetermined gain control range.

10 Claims, 2 Drawing Sheets

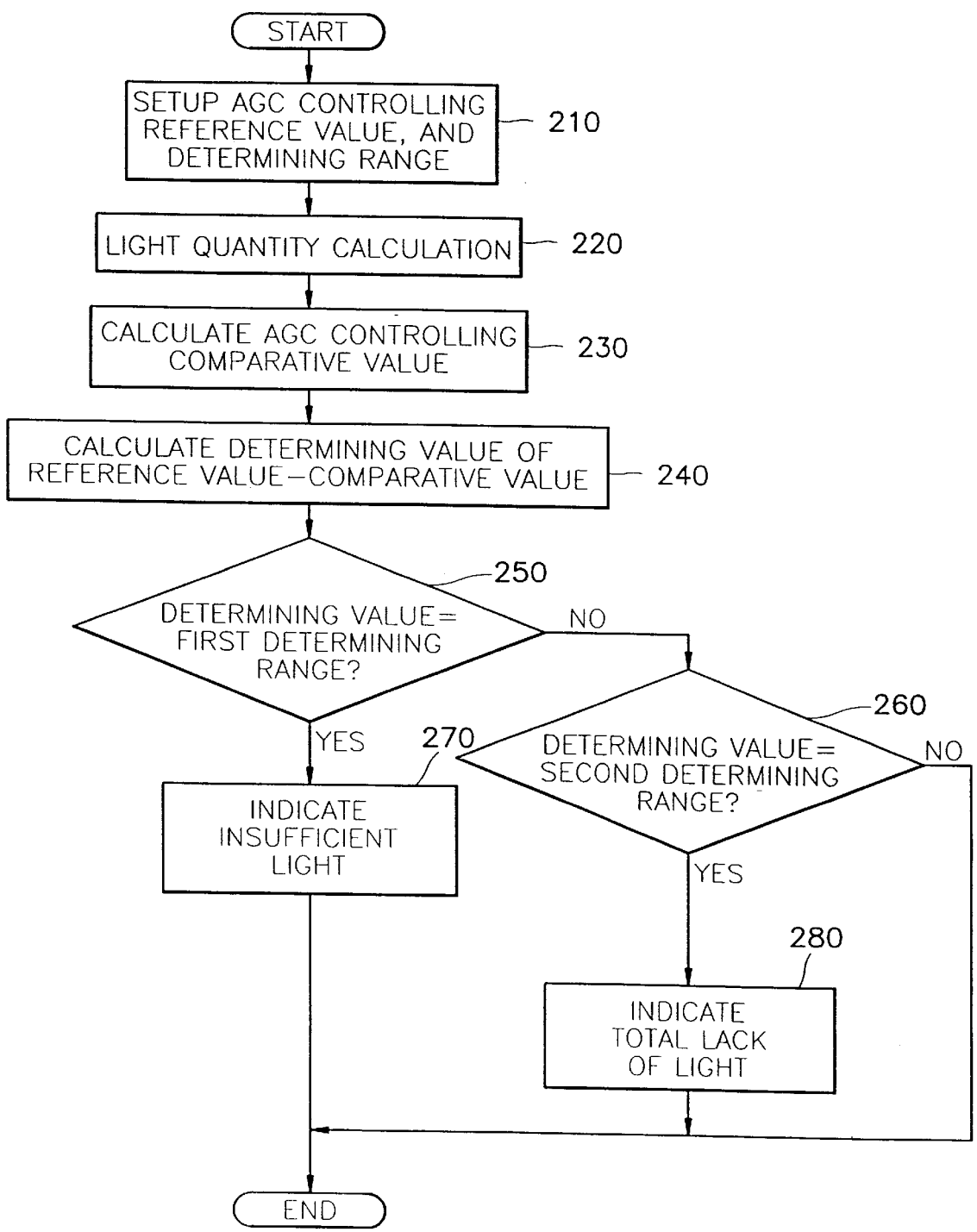

LIGHT LEVEL DETECTING AND INDICATING METHOD FOR IMAGE PHOTOGRAPHING AND RECORDING

BACKGROUND OF THE INVENTION

The present invention relates to a light level detecting method, and more particularly, to a light level detecting method for detecting the level of the environment light when photographing and recording an image, and providing the light level information to the user.

A conventional light level detecting method for an image photographing and recording apparatus is performed by a separate light detecting sensor as shown in FIG. 1. A light detecting sensor 11 detects the level of the environment light, and transmits that information to a control unit 12. The control unit 12 then determines whether the environment light is less than a predetermined reference level. If so, the control unit 12 outputs a light level control signal to an indicator 13, which indicates the states of either an insufficient light or a total lack of light. However, the inclusion of the separate light detecting sensor inevitably leads to an increase in the production costs.

Moreover, using a separate sensor makes it difficult to precisely determine whether the amount of light is sufficient. That is, depending on the characteristics of the lens, the iris, or the charge coupled device (CCD), the amount of light actually reaching the image photographing and recording apparatus may be different from the available environment light.

SUMMARY OF THE INVENTION

It is an object of the present invention to provide a light detecting method using the automatic gain control of an electrically transformed image signal. According to the present invention the actual signal of the image recording process is used. Consequently, the need for a separate light sensor is obviated.

To achieve the above object, there is provided a light detecting method employed in an image photographing and recording device, the light detecting method includes the steps of:
(a) setting up a reference value corresponding to the highest amount of light which requires an automatic gain control;
(b) measuring the amount of light of the input optical signal;
(c) calculating a comparative value corresponding to the measured amount of light, wherein the comparative value controls the performance of the automatic gain control;
(d) comparing the reference value with the comparative value; and
(e) determining that the amount of light is insufficient when the result of the comparing step falls within a predetermined gain control range.

BRIEF DESCRIPTION OF THE DRAWINGS

The above object and advantages of the present invention will become more apparent by describing in detail a preferred embodiment thereof with reference to the attached drawings in which:

FIG. 2 is a flow chart illustrating a light detecting method according to an embodiment of the present invention.

DETAILED DESCRIPTION OF THE INVENTION

A light intensity detecting method according to an embodiment of the present invention will be described below with reference to the flow chart of FIG. 2. An initializing step 210 is provided for setting up a reference value corresponding to an insufficient amount of light, and determining the ranges of light levels, as will be more fully detailed below. In light quantity calculating step 220 an optical signal is received and the level thereof is calculated. A comparative value calculating step 230 is provided for calculating a comparative value corresponding to the calculated level of the optical signal. The determining value calculating step 240 is for calculating a determining value which is used to determine whether the measured amount of light is sufficient. In the first comparing step 250 it is determined whether the determining value falls within a first determining range, while in the second comparing step 260 it is determined whether the determining value falls within a second determining range. A first indicating step 270 is for indicating an insufficient light state, and a second indicating step 280 is for indicating a total lack of light state. Such a method can be employed in a camcorder, a camera used for broadcasting, etc.

Figure 1:
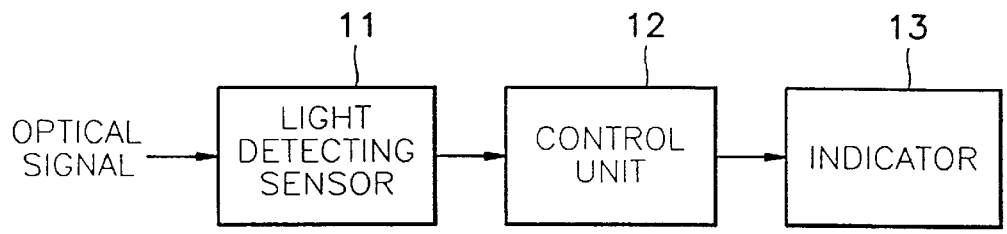
FIG. 1 is a block diagram of a conventional light detecting device.
Figure 3:
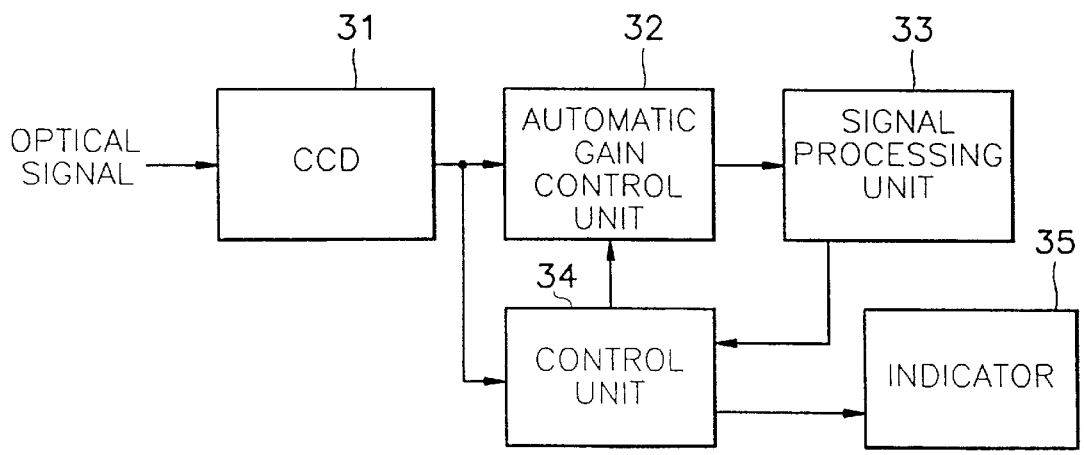
FIG. 3 is a block diagram of a device employing a light detecting method according to an embodiment of the present invention.

Referring to FIG. 3, which is a block diagram of the inventive method as implemented in a camcorder, an optical signal which enters via a lens is converted into an electrical signal by a CCD 31 (charge coupled device), and then transmitted to a signal processing unit 33 either directly or via an automatic gain control unit 32.

The signal processing unit 33 calculates the reference value that corresponds to the level of the optical signal. This can be done by, for example, calculating a mean value of the entire screen or a specific block N×M from the input signal, where N and M indicate the size of a sampling range. The calculated result is transmitted to the control unit 34. The control unit 34 determines whether the input light is sufficient, using subdivided automatic gain control (AGC) ranges. An indicator 35 indicates the light level state corresponding to the output of the control unit 34.

The automatic gain control unit 32 performs automatic gain control on the input optical signal when the amount of light of the input optical signal is insufficient, i.e., when the intensity of the light illuminating the image to be captured is insufficient. Thus the input optical signal is processed to output a stable signal of even intensity. During this processing, the gain value of the automatic gain control (AGC) is changed according to the amount of light of the image to be captured. The present invention determines the amount of light of the input optical signal according to the range of the gain value.

The light detecting method according to an embodiment of the present invention will be described below with reference to FIG. 2.

In the initializing step 210, an AGC reference value, for determining whether the amount of light is insufficient, and AGC determining ranges are set up. The AGC reference value is set to the highest level of light in which the AGC starts to perform. Here, a first AGC determining range indicates a state wherein the amount of light of an image to be captured is insufficient and thus AGC should be performed, and a second AGC determining range indicates a state wherein the amount of light is so low that it is impossible to take a picture even though AGC is performed. The first AGC determining range may include several sub-ranges corresponding to various AGC gain factors.

In the light quantity calculating step 220, an optical signal having entered the camcorder via the lens is converted into an electrical signal and the amount of light thereof is calculated. Here, the amount of light can be obtained by taking a mean value of the input signals in units of frame or of a specific block N×M among the domains constituting the screen, wherein N and M are the sizes of a sampling range.

In the comparative value calculating step 230, a comparative value is calculated, corresponding to the amount of light calculated in the light quantity calculating process 220. The comparative value controls the gain factor of the AGC. Then, in the determining value calculating step 240, a determining value is obtained which is the reference value minus the comparative value.

In the first comparing step 250, it is determined whether the determining value calculated in step 240 falls within the first determining range. If so, AGC is performed and it is determined that the amount of light is sufficient for taking a picture. However, if the determining value falls outside of the first determining range, the process proceeds to step 260. In the second comparing step 260, it is determined whether the amount of light of the input optical signal is too low to take the picture. That is, it is determined whether the determining value falls within the second determining range. If so, the AGC gain factor is increased and it is determined that the available light is too low to take a clear picture, even though AGC is performed.

In the first indicating step 270, the user is informed that the amount of input light is insufficient, i.e., the determining value falls within the first determining range. This may be accomplished using a luminous element display such as an LED or an LCD. On the other hand, in the second indicating step 280, the user is informed that the amount of input light is too low to take a picture, i.e., the determining value falls within the second determining range. The total lack of light state can be displayed using another luminous element. However, it is more effective to cause the luminous element used in the first indicating step 270 to flicker, so as to reduce the number of luminous elements.

If the determining value does not fall within either of the first determining range or the second determining range, the amount of input light is sufficient and thus the AGC is not necessary.

Accordingly, if it is determined that the amount of light is insufficient, a user may use a special auxiliary light to take the picture. Moreover, if it is determined that the amount of light is too low, the user is informed that it is impossible to take a picture without using additional light.

Certain modifications to the present invention may be employed, depending on the particular requirements and applications considered. For example, the first and second comparing steps 250 and 260 can specify more subdivided insufficient light states by using more subdivided determining ranges. Also, it should be realized that the light intensity detecting method according to the present invention can be employed not only in a camcorder, but also in any device which needs such lighting level determination. In any case, the method can be implemented by a microprocessor residing in the device, and the various steps of the method can be stored in a memory device associated with the microprocessor.

As described above, the light detecting method of the present invention determines the amount of light available using an automatic gain control signal, thus reducing production costs and precisely detecting the amount of light without an error resulting from the difference between the amount of environment light and the amount of light reaching the signal processing section.

It is clear that this invention is not limited to the above embodiment but covers the scope perceivable by a person skilled in the art as defined by the amended claims.

What is claimed is:

1. A light detecting method employed in an image photographing and recording device, said light detecting method comprising:
    (a) setting a reference value and a corresponding gain control range as a function of an input optical signal, said reference value corresponding to the highest level of light which requires an automatic gain control;
    (b) measuring a level of light of the input optical signal;
    (c) calculating a comparative value corresponding to the measured level of light,
   wherein said comparative value controls the performance of said automatic gain control;
    (d) comparing said reference value with said comparative value; and
    (e) determining that an amount of light is insufficient when the result of said comparing step falls within said gain control range, and
    (f) indicating whether or not the amount of light is sufficient according to the result of said step (e).

2. A light detecting method as claimed in claim 1, wherein in step (e) it is determined that said amount of light is insufficient when said comparative value is smaller than said reference value.

3. A light detecting method as claimed in claim 1, wherein said amount of light is measured by determining a mean value of a specific sampling block of said input optical signal.

4. A light detecting method as claimed in claim 1, wherein in step (e) said gain control range is subdivided into a first range and a second range, and wherein when the result of said comparing step falls within said first range it is concluded that insufficient light is available for taking a picture without performing gain control, and when the result of said comparing step falls within said second range it is concluded that the available light renders photography impossible.

5. A light detecting method as claimed in claim 4, further comprising a step (f) for indicating that insufficient light is available for taking a picture without AGC by turning on a luminous element, and for indicating that the available light renders photography impossible by making said luminous element flicker.

6. A microprocessor for photographic image recorders, said microprocessor preprogrammed to perform the steps comprising:
    (a) setting a reference value and a corresponding gain control range as a function of an input optical signal, said reference value corresponding to the highest level of light which requires an automatic gain control;
    (b) measuring a level of light of the input optical signal;
    (c) calculating a comparative value corresponding to the measured level of light,
   wherein said comparative value controls the performance of said automatic gain control;
    (d) comparing said reference value with said comparative value; an
    (e) determining that an amount of light is insufficient when the result of said comparing step falls within said gain control range.

7. The microprocessor of claim 6, wherein said amount of light is measured by determining a mean value of a specific sampling block of said input optical signal.

8. The microprocessor of claim 6, wherein said microprocessor further performs a step (f) for indicating whether or not the amount of light is sufficient according to a result of step (e).

9. The microprocessor of claim 6, wherein in step (e) said gain control range is subdivided into a first range and a second range, and wherein when the result of said comparing step falls within said first range it is concluded that insufficient light is available for photography without performing gain control, and when the result of said comparing step falls within said second range it is concluded that the level of available light renders photographing impossible.

10. The microprocessor of claim 9, wherein said microprocessor further performs a step (f) for indicating that insufficient light is available for photography without AGC by turning on a luminous element, and for indicating that the available light level is too low for photography by making said luminous element flicker.

* * * * *